US012700163B2

(12) United States Patent
Chen

(10) Patent No.: US 12,700,163 B2
(45) Date of Patent: Aug. 4, 2026

(54) METHOD FOR GENERATING TEXTURE MAP OF PHYSICAL OBJECT, ELECTRONIC DEVICE, AND COMPUTER READABLE STORAGE MEDIUM

(71) Applicant: HTC Corporation, Taoyuan City (TW)

(72) Inventor: Hsing-Hung Chen, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 203 days.

(21) Appl. No.: 18/637,421

(22) Filed: Apr. 16, 2024

(65) Prior Publication Data

US 2025/0322586 A1      Oct. 16, 2025

(51) Int. Cl.
*G06T 15/04* (2011.01)
*G06T 5/20* (2006.01)
*G06T 5/70* (2024.01)
*G06T 7/40* (2017.01)

(52) U.S. Cl.
CPC ............... *G06T 15/04* (2013.01); *G06T 5/20* (2013.01); *G06T 5/70* (2024.01); *G06T 7/40* (2013.01); *G06T 2207/30201* (2013.01)

(58) Field of Classification Search
CPC .. G06T 15/04; G06T 5/20; G06T 5/70; G06T 7/40; G06T 2207/30201; G06T 11/001; G06T 17/00
See application file for complete search history.

(56) References Cited

U.S. PATENT DOCUMENTS

2018/0374242 A1 *   12/2018   Li ........................... G06N 3/084
2021/0209837 A1 *   7/2021    Chen ..................... G06T 15/506
2024/0020915 A1     1/2024    Zhang et al.

FOREIGN PATENT DOCUMENTS

CN      112102462      12/2020
CN      116228943      6/2023
TW      201802663      1/2018

OTHER PUBLICATIONS

"Office Action of Taiwan Counterpart Application", issued on Nov. 29, 2024, p. 1-p. 9.

* cited by examiner

*Primary Examiner* — Ingchun He
(74) *Attorney, Agent, or Firm* — JCIPRNET

(57) ABSTRACT
The embodiments of the disclosure provide a method for generating a texture map of a physical object, an electronic device, and a computer readable storage medium. The method includes: obtaining an object image of the physical object; determining a first texture map based on the object image, wherein the first texture map is with uneven illuminations; determining a second texture map fitting the first texture map, wherein the second texture map is with even illuminations; determining a reference texture map of the physical object; modifying the reference texture map of the physical object based on the first texture map, the second texture map, and the reference texture map until the reference texture map satisfies a predetermined condition; and determining the reference texture map as the texture map of the physical object in response to determining the reference texture map satisfies the predetermined condition.

20 Claims, 7 Drawing Sheets

METHOD FOR GENERATING TEXTURE MAP OF PHYSICAL OBJECT, ELECTRONIC DEVICE, AND COMPUTER READABLE STORAGE MEDIUM

BACKGROUND

1. Field of the Invention

The present disclosure generally relates to a texture map determining mechanism, in particular, to a method for generating a texture map of a physical object, an electronic device, and a computer readable storage medium.

2. Description of Related Art

See FIG. 1A, which shows a schematic diagram of determining a face of an avatar. In FIG. 1A, once the 3D model 11 of a human and the corresponding texture map 12 are obtained, the 3D model 11 and the texture map 12 can be combined to form the avatar 13 of the human.

For better presenting the light effect of the environment light on the avatar 13 in the engines (e.g., Unity, Unreal, or the like) constructing the virtual environment, the texture map 12 should be with even illuminations.

See FIG. 1B, which shows the comparison between avatars generated with different texture maps. In FIG. 1B, it is assumed that the avatar 13 is generated/determined based on the texture map 12 less affected by the light source, and the avatar 14 is generated/determined based on another texture map more affected by the light source.

In the scenario of FIG. 1B, the reason why the texture map 12 and the texture map used to generate the avatar 14 are affected by the environment light may result from, for example, the uneven environment light (e.g., sunlight, lamps) from different angles when capturing these texture maps.

In the case of FIG. 1B, the avatar 13 should be able provide more realistic light effect in the virtual environment with environment light than the avatar 14.

Therefore, to create a proper avatar, the conventional process needs to take factors such as the human face pose, the corresponding 3D model, the parameters associated with the environment light models, the texture map, and the human face image into consideration, which needs a lot of computation efforts.

SUMMARY OF THE INVENTION

Accordingly, the disclosure is directed to a method for generating a texture map of a physical object, an electronic device, and a computer readable storage medium, which may be used to solve the above technical problems.

The embodiments of the disclosure provide a method for generating a texture map of a physical object, executed by an electronic device. The method includes: obtaining, by the electronic device, an object image of the physical object; determining, by the electronic device, a first texture map based on the object image, wherein the first texture map is with uneven illuminations; determining, by the electronic device, a second texture map fitting the first texture map, wherein the second texture map is with even illuminations; determining, by the electronic device, a reference texture map of the physical object; modifying, by the electronic device, the reference texture map of the physical object based on the first texture map, the second texture map, and the reference texture map until the reference texture map satisfies a predetermined condition; and determining, by the electronic device, the reference texture map as the texture map of the physical object in response to determining the reference texture map satisfies the predetermined condition.

The embodiments of the disclosure provide an electronic device including a storage circuit and a processor. The storage circuit stores a program code. The processor is coupled to the storage circuit and accesses the program code to perform: obtaining an object image of the physical object, wherein the first texture map is with uneven illuminations; determining a first texture map based on the object image; determining a second texture map fitting the first texture map, wherein the second texture map is with even illuminations; determining a reference texture map of the physical object; modifying the reference texture map of the physical object based on the first texture map, the second texture map, and the reference texture map until the reference texture map satisfies a predetermined condition; and determining the reference texture map as the texture map of the physical object in response to determining the reference texture map satisfies the predetermined condition.

The embodiments of the disclosure provide a computer readable storage medium, the computer readable storage medium recording an executable computer program, the executable computer program being loaded by an electronic device to perform steps of: obtaining an object image of the physical object; determining a first texture map based on the object image, wherein the first texture map is with uneven illuminations; determining a second texture map fitting the first texture map, wherein the second texture map is with even illuminations; determining a reference texture map of the physical object; modifying the reference texture map of the physical object based on the first texture map, the second texture map, and the reference texture map until the reference texture map satisfies a predetermined condition; and determining the reference texture map as the texture map of the physical object in response to determining the reference texture map satisfies the predetermined condition.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1A:
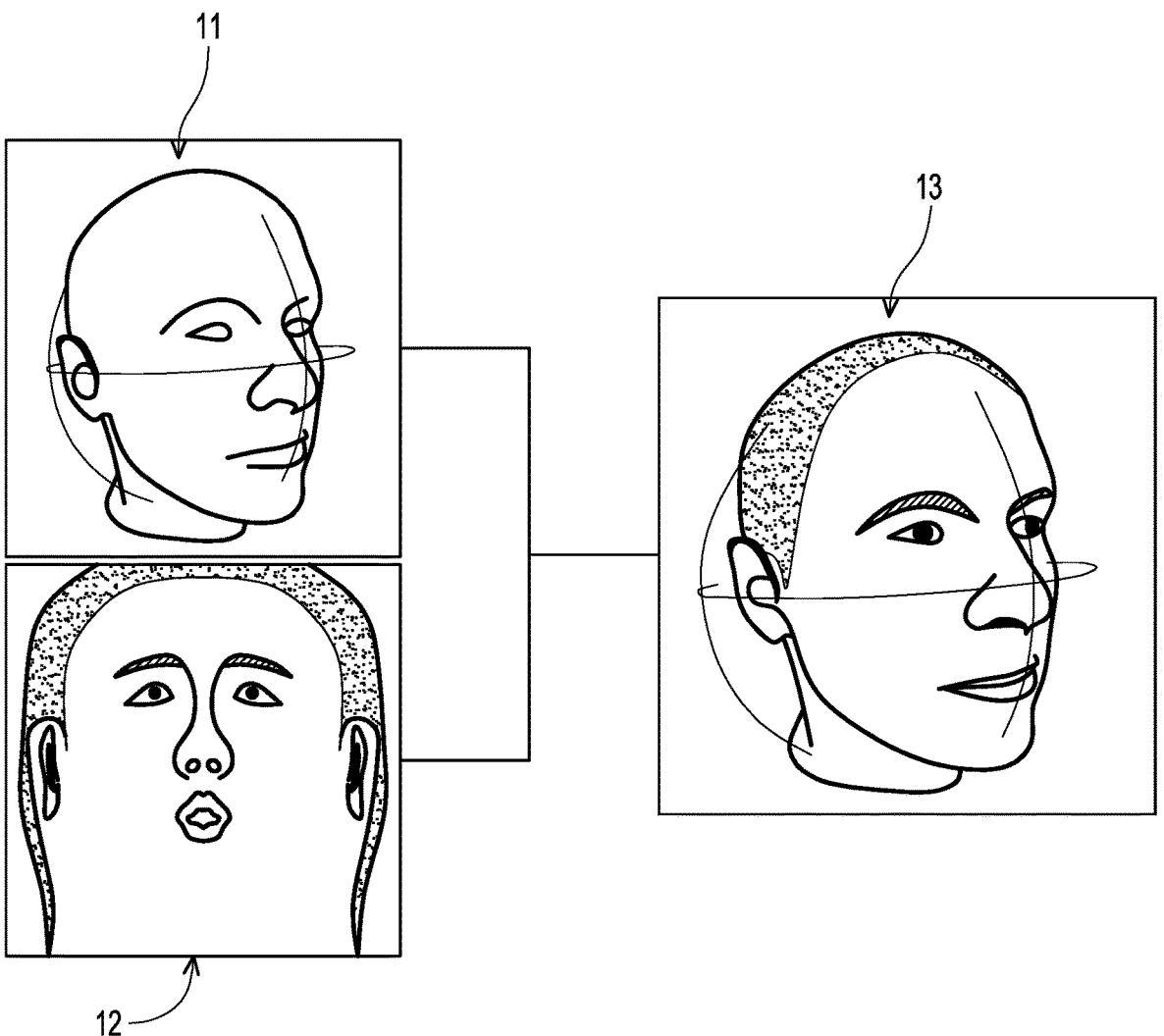
FIG. 1A shows a schematic diagram of determining a face of an avatar.

Reference will now be made in detail to the present preferred embodiments of the invention, examples of which are illustrated in the accompanying drawings. Wherever possible, the same reference numbers are used in the drawings and the description to refer to the same or like parts.

Figure 2:
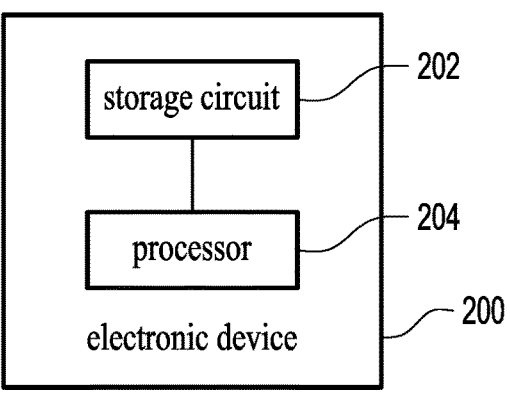
FIG. 2 shows a schematic diagram of an electronic device according to an embodiment of the disclosure.

See FIG. 2, which shows a schematic diagram of an electronic device according to an embodiment of the disclosure. In various embodiments, the electronic device 200 can be implemented as any smart device, computer device, or the like.

In FIG. 2, The storage circuit 202 is one or a combination of a stationary or mobile random access memory (RAM), read-only memory (ROM), flash memory, hard disk, or any other similar device, and which records a plurality of modules and/or a program code that can be executed by the processor 204.

The processor 204 may be coupled with the storage circuit 202, and the processor 204 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 204 may access the modules and/or the program code stored in the storage circuit 202 to implement the method for generating a texture map of a physical object provided in the disclosure, which would be further discussed in the following.

Figure 3:
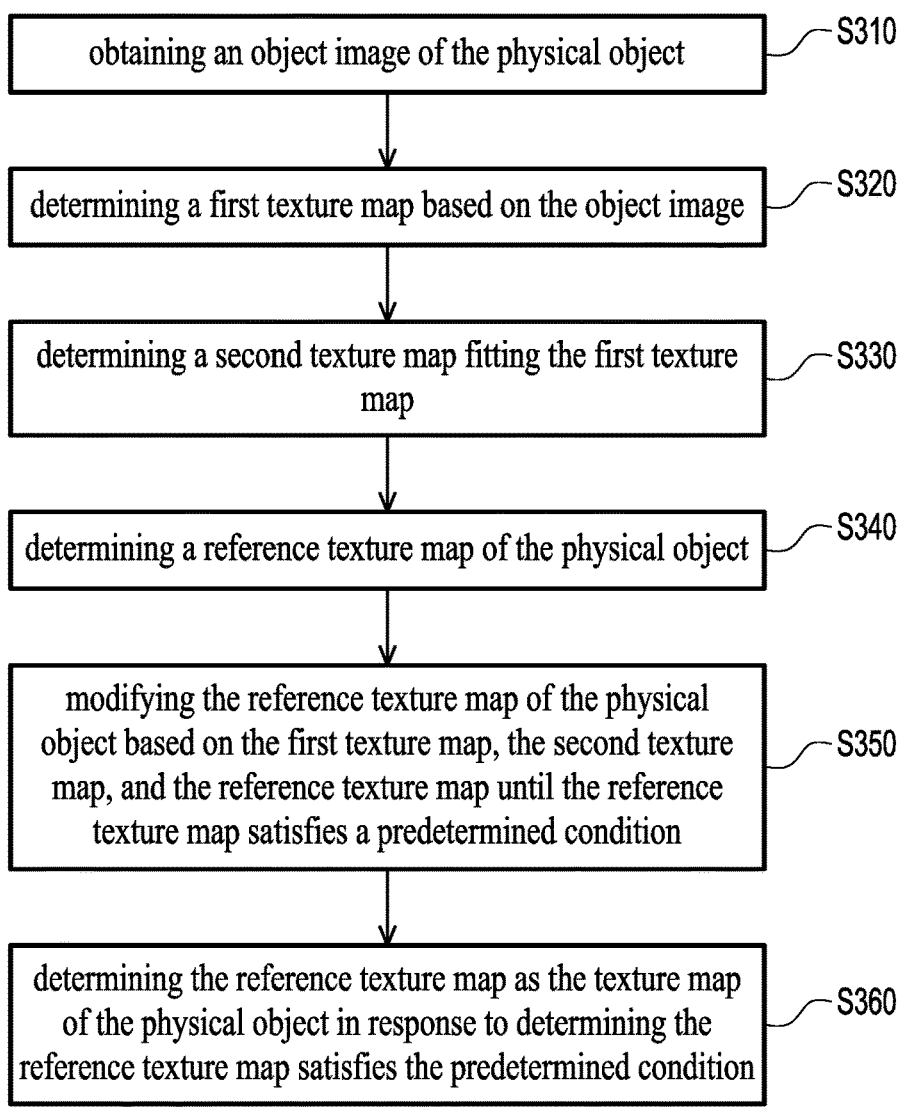
FIG. 3 shows a flow chart of the method for generating a texture map of a physical object according to an embodiment of the disclosure.

See FIG. 3, which shows a flow chart of the method for generating a texture map of a physical object according to an embodiment of the disclosure. The method of this embodiment may be executed by the electronic device 200 in FIG. 2, and the details of each step in FIG. 3 will be described below with the components shown in FIG. 2. For better explaining the concept of the disclosure, FIG. 4 would be used as an example, wherein FIG. 4 shows an application scenario according to a first embodiment of the disclosure.

In step S310, the processor 204 obtains an object image 411 of the physical object 410. In one embodiment, the processor 204 may further obtain a 3D model 412 corresponding to the physical object 410.

Figure 4:
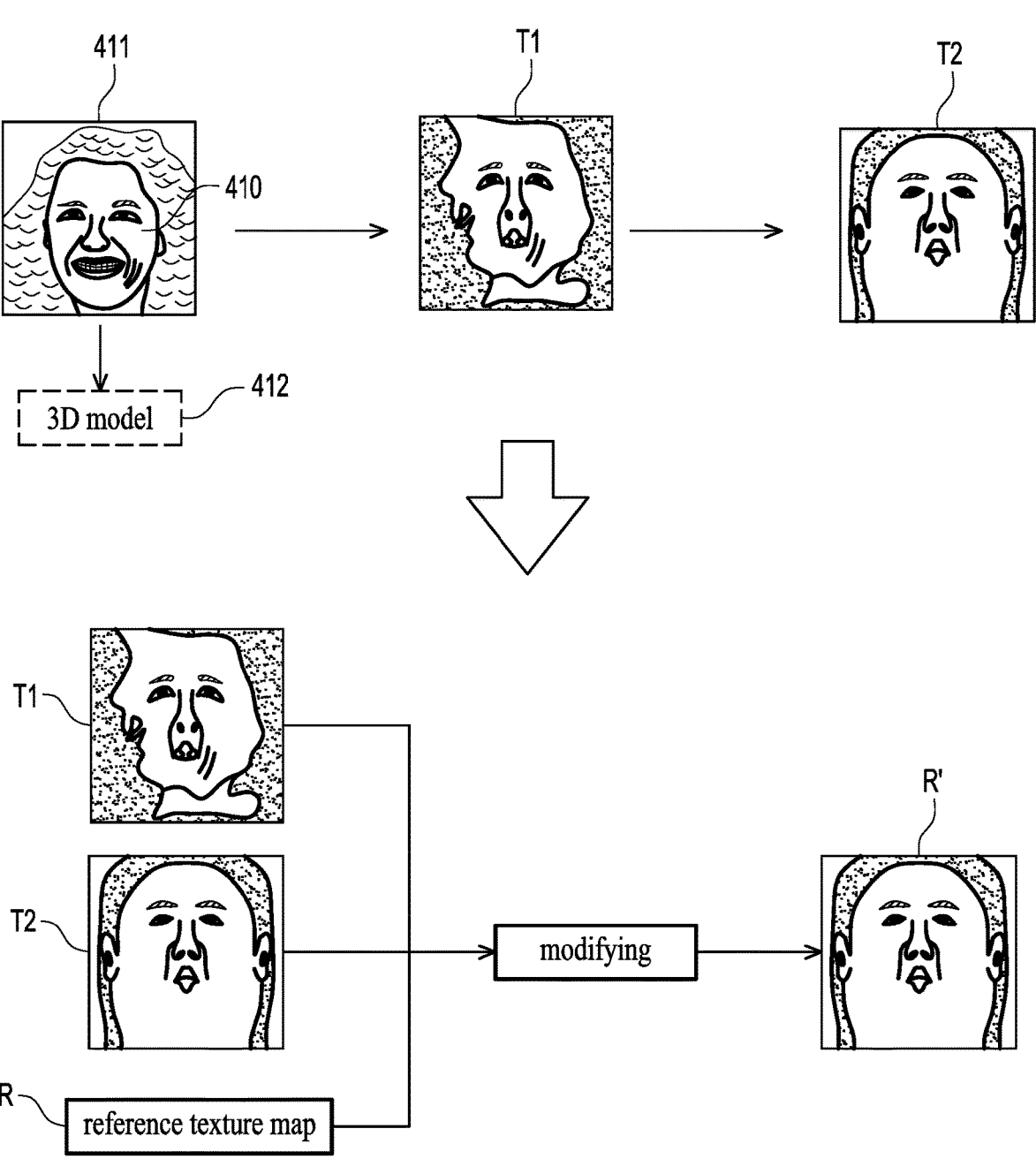
FIG. 4 shows an application scenario according to a first embodiment of the disclosure.

In FIG. 4, the physical object 410 may be a human face, the 3D model 412 corresponding to the physical object 412 may be a head model (e.g., the 3D model 11 in FIG. 1A). In the embodiment, the 3D model 412 may have a contour corresponding to the contour of the physical object 410.

In other embodiments, the physical object considered in step S310 can be any creature and/or object whose texture map is to be determined by the electronic device 200, and the corresponding 3D model may have a contour corresponding to the contour of the considered physical object, but the disclosure is not limited thereto.

In one embodiment, the object image 411 can be obtained by using a camera to capture the image of the physical object 410. In one embodiment, the object image 411 may include a plurality of sided-view images of the physical object 410. For example, the sided-view images may include right/central/left sided images of the physical object 410, but the disclosure is not limited thereto.

In one embodiment, with the object image 411, the processor 204 may accordingly determine the corresponding 3D model 412 of the physical object 410. For example, the processor 204 may determine the 3D model 412 based on the mechanisms described in the document of "*FFHQ-UV: Normalized Facial UV-Texture Dataset for 3D Face Reconstruction*", but the disclosure is not limited thereto.

In step S320, the processor 204 determines a first texture map T1 based on the object image 411. In one embodiment, the processor 204 may perform step S320 based on the mechanism described in the document of "*FFHQ-UV: Normalized Facial UV-Texture Dataset for 3D Face Reconstruction*", but the disclosure is not limited thereto.

In the embodiment where the object image 411 includes a plurality of sided-images, the processor 204 may obtaining a plurality of multi-view texture maps based on the sided-view images. In one embodiment, the plurality of multi-view texture maps may be the corresponding texture maps respectively determined based on the plurality of sided-images. For example, the plurality of multi-view texture maps may be the texture maps respectively corresponding to the right/central/left sided images of the physical object 410, but the disclosure is not limited thereto. In addition, the processor 204 may (linearly) blend the multi-view texture maps into the first texture map T1, and the associated details may also be referred to the document of "*FFHQ-UV: Normalized Facial UV-Texture Dataset for 3D Face Reconstruction*", but the disclosure is not limited thereto.

In some embodiments, the first texture map T1 may have facial details that are the same as or close to the object image (e.g. crepes, moles, skin color, scars, fine hair, etc.).

In the embodiments of the disclosure, each mentioned texture map may be a UV texture map, but the disclosure is not limited thereto.

In step S330, the processor 204 determines a second texture map T2 fitting the first texture map T1.

In one embodiment, the processor 204 may determine the second texture map T2 via combining a plurality of template texture maps. In one embodiment, the plurality of template texture maps may include the texture maps corresponding to other physical objects. In FIG. 4, since the physical object 410 is assumed to be a human face, the plurality of template texture maps may include a mean face texture and a plurality of predetermined facial texture maps.

In the embodiments of the disclosure, the processor 204 may perform a linear combination on the template texture maps to determine a combined texture map approximating to the first texture map T1. That is, the processor 204 may perform a weighted combination of the template texture maps to determine the combined texture map, such that the difference between the combined texture map and the first texture map T1 is minimized or as small as possible.

In other embodiments, the processor 204 can also superimpose one or more of the predetermined facial texture maps onto the mean face texture to change the skin color and/or the texture of the mean face texture to generate the combined texture map, but the disclosure is not limited thereto.

Afterwards, the processor 204 may determine the combined texture map as the second texture map T2 fitting the first texture map T1.

Figure 1B:
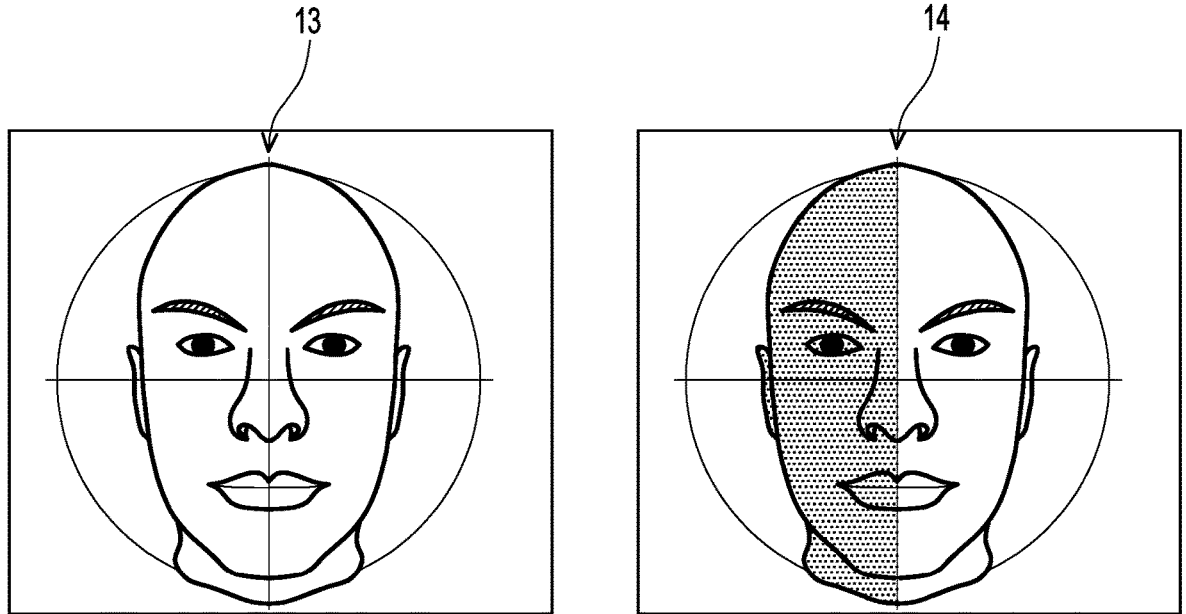
FIG. 1B shows the comparison between avatars generated with different texture maps.

In some embodiments, each template texture maps may be with even illuminations, neutral expressions, and/or cleaned regions (e.g., no eyeglasses and hair). That is, if each template texture map is used to be combined with the corresponding 3D models (e.g., the head models of the corresponding people), the results would provide visual effects closer to the avatar 13 in FIG. 1B, rather than the avatar 14, but the disclosure is not limited thereto.

In this case, the second texture map T2 would also have a characteristic of being with even illuminations (e.g., evenly/uniformly illuminated by, for example, the environment light), neutral expressions, and/or cleaned regions (e.g., no eyeglasses and hair), but the disclosure is not limited thereto.

In the embodiments of the disclosure, the second texture map T2 does not have the same or close facial details as the object image (e.g. wrinkles, moles, skin color, scars, fine hair, etc.).

In step S340, the processor 204 determines a reference texture map R of the physical object 410. In one embodiment, the processor 204 may initiate the reference texture map R via determining the second texture map T2 as the initiated reference texture map R. In another embodiment, the reference texture map R determined/initiated in step S340 may be an empty texture map. In other embodiments, the processor 204 may initiate the reference texture map R based on any requirements of the designer, but the disclosure is not limited thereto.

In step S350, the processor 204 modifies the reference texture map R of the physical object 410 based on the first texture map T1, the second texture map T2, and the reference texture map R until the reference texture map R satisfies a predetermined condition.

In one embodiment, step S350 may be implemented by using the mechanism introduced in the following FIG. 5.

Figure 5:
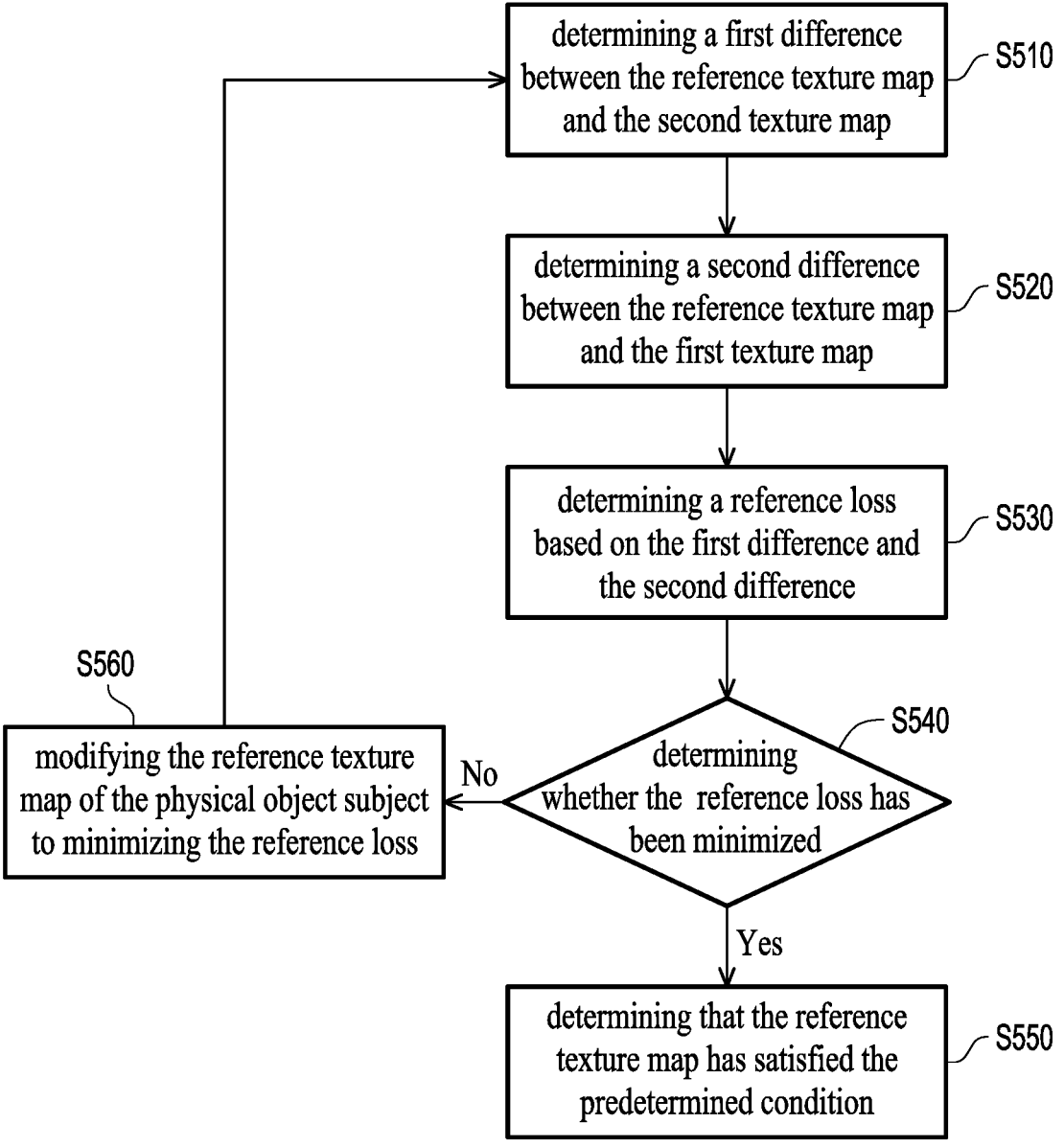
FIG. 5 shows the mechanism of modifying the reference texture map according to the first embodiment of the disclosure.

See FIG. 5, which shows the mechanism of modifying the reference texture map according to the first embodiment of the disclosure.

In step S510, the processor 204 determines a first difference (referred to as L1 hereinafter) between the reference texture map R and the second texture map T2. In one embodiment, the processor 204 may determine the first difference via subtracting the second texture map T2 from the reference texture map R. In this case, the first difference L1 may be characterized as "L1=R−T2", but the disclosure is not limited thereto.

In step S520, the processor 204 determines a second difference (referred to as L2 hereinafter) between the reference texture map R and the first texture map T1. In one embodiment, the processor 204 may determine the second difference via subtracting the first texture map T1 from the reference texture map R. In this case, the second difference L2 may be characterized as "L2=R−T1", but the disclosure is not limited thereto.

In various embodiments, step S520 can also be performed before step S510 or simultaneously with step S510 based on the requirements of the designer, but the disclosure is not limited thereto.

After obtaining the first difference L1 and the second difference L2, the processor 204 may determine a reference loss (referred to as LL hereinafter) based on the first difference L1 and the second difference L2 in step S530.

In one embodiment, the reference loss LL may be a linear combination of the first difference L1 and the second difference L2. In this case, the reference loss LL may be characterized as "LL=w1*L1+w2*L2", wherein w1 and w2 may be the weightings respectively corresponding to the first difference L1 and the second difference L2. In various embodiments, w1 and w2 can be arbitrarily determined based on the requirements of the designer. For example, w1 and w2 may be both determined as 0.5, but the disclosure is not limited thereto.

In step S540, the processor 204 may determine whether the reference loss LL has been minimized. In one embodiment, the processor 204 may determine whether the reference loss LL has been lower than a predetermined threshold. In one embodiment, in response to determining that the reference loss LL is lower than the predetermined threshold, the processor 204 may determine that the reference loss LL has been minimized and proceed to step S550. On the other hand, in response to determining that the reference loss LL is not lower than the predetermined threshold, the processor 204 may determine that the reference loss LL has not been minimized and proceed to step S560.

In step S560, the processor 204 may modify the reference texture map R of the physical object 410 subject to minimizing the reference loss LL. That is, the processor 204 may modify the contents/features/values/intensities of one or more of the pixels the reference texture map R, such that the reference loss LL may be minimized or at least be reduced. Afterwards, the processor 204 may return to step S510, such that the reference texture map R can be repeatedly modified/updated until the reference loss LL has been minimized, but the disclosure is not limited thereto.

In step S550, the processor 204 may determine that the reference texture map R has satisfied the predetermined condition.

For better explaining the concept of the disclosure, the reference texture map R' would be assumed to be satisfying the predetermined condition (e.g., the reference loss LL corresponding to the reference texture map R' has been minimized). From another perspective, the reference texture map R' may be understood as the result generated by (repeatedly) modifying the reference texture map R, but the disclosure is not limited thereto.

Referring back to FIG. 3, in step S360, the processor 204 determines the reference texture map R' as the texture map of the physical object 410 in response to determining the reference texture map R' satisfies the predetermined condition.

Accordingly, the texture map of the physical object 410 can be determined in a more efficient way with less computation. In addition, in the embodiments where the considered template texture maps are with even illuminations, the texture map of the physical object 410 (i.e., the reference texture map R') would also be with even illuminations. In this case, since the process of determining the texture map of the physical object 410 is less complicated than the conventional way, the computation efforts can be reduced.

In other embodiments, quality of the texture map of the physical object 410 can be improved by one or a combination of the following embodiments.

Figure 6:
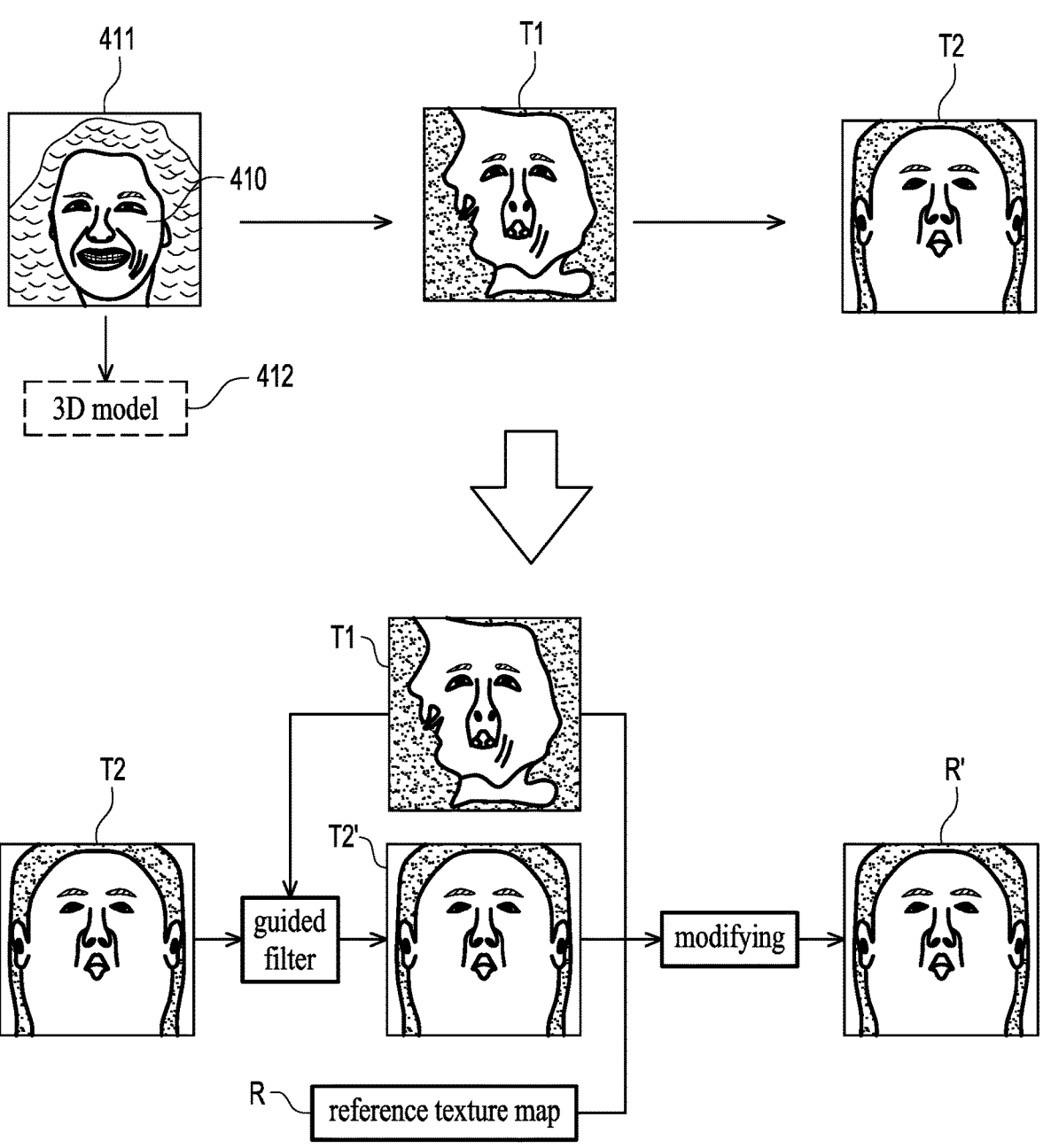
FIG. 6 shows an application scenario according to a second embodiment of the disclosure.

See FIG. 6, which shows an application scenario according to a second embodiment of the disclosure. In FIG. 6, the difference between the first embodiment and the second embodiment is that before modifying the reference texture map R, the second texture map T2 may be further modified/updated by using a guided filter.

Specifically, the processor 204 may modify the second texture map T2 via applying the guided filter to the second texture map T2 based on the first texture map T1.

For better explaining the concept of the disclosure, the second texture map T2' would be assumed to be the result of applying the guided filter to the second texture map T2, but the disclosure is not limited thereto.

After applying the guided filter as mentioned in the above, the second texture map T2' may have the details of the first texture map T1 but have the intensity (e.g., brightness) of the second texture map T2.

In the second embodiment, the processor 204 may modify the reference texture map R based on the first texture map T1, the second texture map T2' (rather than the second texture map T2 as in the first embodiment), and the reference texture map R until the reference texture map satisfies the predetermined condition.

In the second embodiment, the first difference may be characterized as "L1=R−T2'", and the details of modifying the reference texture map R may be referred to the above embodiments, which would not be repeated herein.

Since the second texture map T2' can be regarded as an improved version of the second texture map T2, the reference texture map R' determined in the second embodiment would be more realistic than the reference texture map R' determined in the first embodiment.

In a third embodiment, the process of modifying the reference texture map R may be adjusted to better determine the first difference L1.

Figure 7:
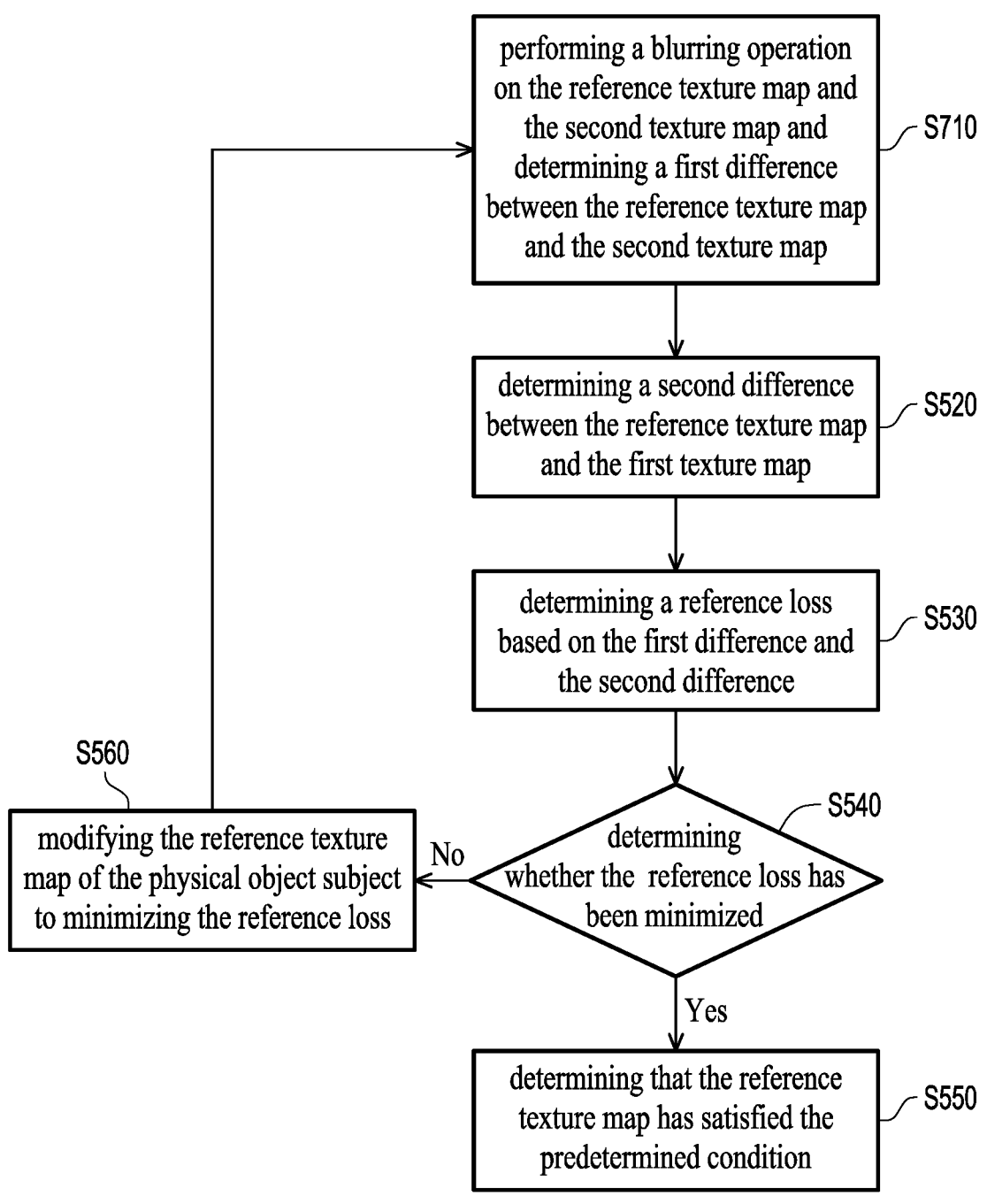
FIG. 7 shows the mechanism of modifying the reference texture map according to the third embodiment of the disclosure.

See FIG. 7, which shows the mechanism of modifying the reference texture map according to the third embodiment of the disclosure. In the embodiment, the processor 204 may determine the first difference L1 in a way different from FIG. 5.

Specifically, in step S710, the processor 204 may perform a blurring operation on the reference texture map R and the second texture map T2 and determining a first difference L1 between the reference texture map R and the second texture map T2. In some embodiments, the blurring operation may be a Gaussian blur operation or any other blur operation preferred by the designer, but the disclosure is not limited thereto.

For better explaining the concept of the disclosure, the reference texture map R after experiencing the blur operation may be represented by the reference texture map blur(R), and the second texture map T2 after experiencing the blur operation may be represented by the reference texture map blur(T2). In this case, the first difference L1 in the third embodiment may be characterized as "L1=blur(R)−blur(T2)", but the disclosure is not limited thereto.

In the third embodiment, the processor 204 may also perform steps S520 to S560 as in the first embodiment, and the associated details may be referred to the above embodiments.

In the third embodiment, the high frequency information in the reference texture map R and the second texture map T2 may be removed via the blur operation, which may better determine the first difference L1. In this case, the reference texture map R may be (repeatedly) modified in a more efficient way, which further reduces the computation efforts.

In one embodiment, the first to the third embodiments may be further combined into a fourth embodiment. That is, the processor 204 may use the mechanism in FIG. 6 to determine the first texture map T1, the second texture map T2', and the reference texture map R, and then use the mechanism in FIG. 7 to (repeatedly) modify the reference texture map R until the reference texture map R satisfies the predetermined condition.

In this case, the advantageous effects of the first to the third embodiments can all be achieved in the fourth embodiment.

In one embodiment, after obtaining the texture map of the physical object 410 (e.g., the reference texture map R'), the processor 204 may further determine an avatar corresponding to the physical object 410 via combining the texture map of the physical object 410 with the 3D model 412 corresponding to the physical object 410.

In the embodiment where the physical object 410 is a human face, the 3D model 412 corresponding to the physical object 410 may be a head model having a face region. For better understanding, the reference texture map R' may be assumed to be the texture map 12 in FIG. 1A, and the 3D model 412 may be assumed as the 3D model 11 in FIG. 1A, but the disclosure is not limited thereto.

In this case, the processor 204 may combine the texture map of the physical object 410 with the face region on the 3D model 11 to generate a face of the avatar corresponding to the physical object 410. Under the above assumption, the resulted avatar may be the avatar 13 evenly/uniformly illuminated by the environment light in FIG. 1A, but the disclosure is not limited thereto.

In addition, although the embodiments in the above are discussed under the assumption where the physical object 410 is a human face, in other embodiments, the considered physical object can be adjusted to be any other creatures/object based on the requirements of the designer, but the disclosure is not limited thereto.

The disclosure further provides a computer readable storage medium for executing the method for generating a texture map of a physical object. The computer readable storage medium is composed of a plurality of program instructions (for example, a setting program instruction and a deployment program instruction) embodied therein. These program instructions can be loaded into the electronic device 200 and executed by the same to execute the method for generating a texture map of a physical object and the functions of the host 200 described above.

In summary, the embodiments of the disclosure provide solutions to determine the texture map of the physical object in a more efficient way with less computation effort and better texture map quality.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for generating a texture map of a physical object, executed by an electronic device, comprising:
   obtaining, by the electronic device, an object image of the physical object;
   determining, by the electronic device, a first texture map based on the object image, wherein the first texture map is with uneven illuminations;
   determining, by the electronic device, a second texture map fitting the first texture map, wherein the second texture map is with even illuminations;
   determining, by the electronic device, a reference texture map of the physical object;
   modifying, by the electronic device, the reference texture map of the physical object based on the first texture map, the second texture map, and the reference texture map until the reference texture map satisfies a predetermined condition; and
   determining, by the electronic device, the reference texture map as the texture map of the physical object in response to determining the reference texture map satisfies the predetermined condition.

2. The method according to claim 1, comprising:
   performing a linear combination on a plurality of template texture maps to determine a combined texture map approximating to the first texture map; and
   determining the combined texture map as the second texture map fitting the first texture map.

3. The method according to claim 1, wherein determining the reference texture map of the physical object comprises:

initiating the reference texture map via determining the second texture map as the initiated reference texture map.

4. The method according to claim 1, wherein modifying the reference texture map of the physical object based on the first texture map, the second texture map, and the reference texture map until the modified reference texture map satisfies the predetermined condition comprises following steps:

(a) determining a first difference between the reference texture map and the second texture map;

(b) determining a second difference between the reference texture map and the first texture map;

(c) determining a reference loss based on the first difference and the second difference;

(d) modifying the reference texture map of the physical object subject to minimizing the reference loss;

(e) in response to determining that the reference loss has been minimized, determining that the reference texture map has satisfied the predetermined condition, otherwise return to step (a).

5. The method according to claim 4, wherein before determining the first difference, step (a) further comprises:

performing a blurring operation on the reference texture map and the second texture map.

6. The method according to claim 5, wherein the blur operation is a Gaussian blur operation.

7. The method according to claim 4, wherein the reference loss is a linear combination of the first difference and the second difference.

8. The method according to claim 4, wherein determining the first difference between the reference texture map and the second texture map comprises subtracting the second texture map from the reference texture map.

9. The method according to claim 4, wherein determining the second difference between the reference texture map and the first texture map comprises subtracting the first texture map from the reference texture map.

10. The method according to claim 1, wherein before modifying the reference texture map of the physical object based on the first texture map, the second texture map, and the reference texture map until the reference texture map satisfies the predetermined condition, the method further comprises:

modifying the second texture map via applying a guided filter to the second texture map based on the first texture map.

11. The method according to claim 1, further comprising:

obtaining a 3D model corresponding to the physical object;

determining an avatar corresponding to the physical object via combining the texture map of the physical object with the 3D model corresponding to the physical object.

12. The method according to claim 11, wherein the physical object is a human face, the 3D model corresponding to the physical object is a head model having a face region, and combining the texture map of the physical object with the 3D model corresponding to the physical object comprises:

combining the texture map of the physical object with the face region to generate a face of the avatar corresponding to the physical object.

13. The method according to claim 1, wherein the object image comprises a plurality of sided-view images of the physical object, and determining the first texture map based on the object image comprises:

obtaining a plurality of multi-view texture maps based on the sided-view images; and blending the multi-view texture maps into the first texture map.

14. An electronic device, comprising:

a non-transitory storage circuit, storing a program code; and a processor, coupled to the non-transitory storage circuit and accessing the program code to perform:

obtaining an object image of a physical object;

determining a first texture map based on the object image, wherein the first texture map is with uneven illuminations;

determining a second texture map fitting the first texture map, wherein the second texture map is with even illuminations;

determining a reference texture map of the physical object;

modifying the reference texture map of the physical object based on the first texture map, the second texture map, and the reference texture map until the reference texture map satisfies a predetermined condition; and determining the reference texture map as the texture map of the physical object in response to determining the reference texture map satisfies the predetermined condition.

15. The electronic device according to claim 14, wherein the processor performs:

(a) determining a first difference between the reference texture map and the second texture map;

(b) determining a second difference between the reference texture map and the first texture map;

(c) determining a reference loss based on the first difference and the second difference;

(d) modifying the reference texture map of the physical object subject to minimizing the reference loss;

(e) in response to determining that the reference loss has been minimized, determining that the reference texture map has satisfied the predetermined condition, otherwise return to (a).

16. The electronic device according to claim 15, wherein before determining the first difference, the processor further performs:

performing a blurring operation on the reference texture map and the second texture map.

17. The electronic device according to claim 14, wherein before modifying the reference texture map of the physical object based on the first texture map, the second texture map, and the reference texture map until the reference texture map satisfies the predetermined condition, the processor further performs:

modifying the second texture map via applying a guided filter to the second texture map based on the first texture map.

18. The electronic device according to claim 14, wherein the processor further performs:

obtaining a 3D model corresponding to the physical object;

determining an avatar corresponding to the physical object via combining the texture map of the physical object with the 3D model corresponding to the physical object.

19. The electronic device according to claim 18, wherein the physical object is a human face, the 3D model corresponding to the physical object is a head model having a face region, and the processor performs:

combining the texture map of the physical object with the face region to generate a face of the avatar corresponding to the physical object.

20. A non-transitory computer readable storage medium, the computer readable storage medium recording an executable computer program, the executable computer program being loaded by an electronic device to perform steps of:

obtaining an object image of a physical object;

determining a first texture map based on the object image, wherein the first texture map is with uneven illuminations;

determining a second texture map fitting the first texture map, wherein the second texture map is with even illuminations;

determining a reference texture map of the physical object;

modifying the reference texture map of the physical object based on the first texture map, the second texture map, and the reference texture map until the reference texture map satisfies a predetermined condition; and determining the reference texture map as the texture map of the physical object in response to determining the reference texture map satisfies the predetermined condition.

* * * * *